(12) United States Patent
Chou et al.

(10) Patent No.: US 8,443,337 B2
(45) Date of Patent: May 14, 2013

(54) METHODOLOGY AND TOOLS FOR TABLED-BASED PROTOCOL SPECIFICATION AND MODEL GENERATION

(75) Inventors: Ching-Tsun Chou, Palo Alto, CA (US); Phanindra K. Mannava, Folsom, CA (US); Seungjoon Park, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1464 days.

(21) Appl. No.: 12/075,390

(22) Filed: Mar. 11, 2008

(65) Prior Publication Data

US 2009/0235228 A1    Sep. 17, 2009

(51) Int. Cl.
*G06F 9/44*    (2006.01)
(52) U.S. Cl.
USPC .......................................... 717/104; 717/142

(58) Field of Classification Search .................. None
See application file for complete search history.

(56) References Cited

U.S. PATENT DOCUMENTS

| | | | | |
|---|---|---|---|---|
| 6,009,488 | A | 12/1999 | Kavipurapu | 710/105 |
| 7,640,495 | B2 * | 12/2009 | Ballinger et al. | 715/237 |
| 2006/0200499 | A1 * | 9/2006 | Bhatia et al. | 707/200 |
| 2006/0259508 | A1 * | 11/2006 | Sikdar et al. | 707/102 |
| 2008/0168420 | A1 * | 7/2008 | Sabbouh | 717/104 |
| 2009/0063559 | A1 * | 3/2009 | Rhodes et al. | 707/104.1 |
| 2009/0094112 | A1 * | 4/2009 | Cesarini et al. | 705/14 |
| 2010/0199354 | A1 * | 8/2010 | Eker et al. | 726/26 |

* cited by examiner

*Primary Examiner* — Elias Mamo
(74) *Attorney, Agent, or Firm* — Trop, Pruner & Hu, P.C.

(57) ABSTRACT

In one embodiment, the present invention includes a method for associating and storing a code fragment for each cell of a table for a protocol specification in a semantic mapping corresponding to the table, and automatically generating a formal model for the protocol specification using the table and the semantic mapping. Other embodiments are described and claimed.

15 Claims, 3 Drawing Sheets

METHODOLOGY AND TOOLS FOR TABLED-BASED PROTOCOL SPECIFICATION AND MODEL GENERATION

BACKGROUND

Tables are used in protocol specifications, especially in specifying protocol state transitions. By laying out information in two dimensions (rows and columns), a reader can more easily gain a bird's-eye view from tables than from text. Further, the two-dimensional structure of tables also makes it easier to spot missing conditions in tables than in texts, so tables are more likely to be complete than texts. Changes to a protocol can typically be realized as localized changes to specific rows and/or columns in the tables, as opposed to diffused and unstructured changes in a text-based specification. However, tables in traditional specifications are informal and their potentials not fully utilized.

DETAILED DESCRIPTION

Embodiments may use tables as a central piece of a specification such as a protocol specification. In some implementations, various protocol models and checkers can be directly derived from the tables in their respective specifications via an automated process as described below. Such an automated process not only reduces the overhead required in generating protocol models and checkers, but also makes it less likely for mistakes to occur.

Figure 1:
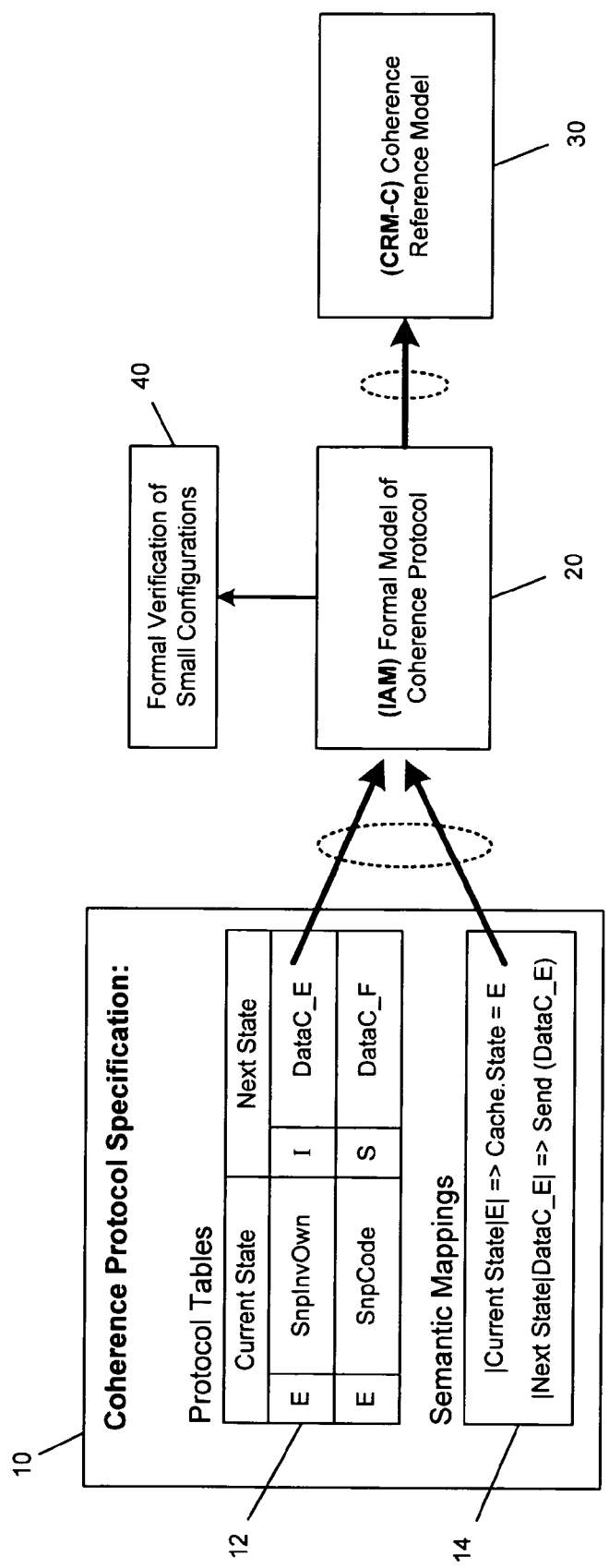
FIG. 1 is a flow diagram of a methodology used for table-based protocol specification and model generation in accordance with an embodiment of the present invention.

Referring now to FIG. 1, shown is a flow diagram of a methodology used for table-based protocol specification and model generation in accordance with an embodiment of the present invention. As shown in FIG. 1, a specification 10 may be provided that includes a protocol specification in tabular form. Specifically, as shown in FIG. 1 specification 10, which may be a protocol specification for a given computer system, may include protocol tables 12 which are two dimensional tables. In the embodiment shown in FIG. 1, as an example, the specification may be for a coherence protocol (e.g., a cache coherency protocol for a point-to-point interconnect system) in which a current state section and a next state section include various entries or cells in a row and column format. In addition, for each cell of table 12, a semantic mapping 14 can be generated. Each semantic mapping 14 may assign a meaning in the form of a code fragment for each cell within table 12, as will be discussed further below.

Then, using this protocol specification 10, which may be stored in a storage medium such as a dynamic random access medium (DRAM) or other such machine-accessible storage medium, a formal model 20 of the coherence protocol may be automatically generated. In one embodiment, the formal model may be an implementation agnostic model (IAM) model, which as will be described further below, may be automatically generated from tables 12 and semantic mappings 14 of specification 10. Still further, from this IAM formal model, a coherence reference model 30 may also be automatically generated. Further, using formal model 20, a formal verification of small configurations 40 may also be performed. While shown in this particular implementation as a coherence protocol, understand the scope of the present invention is not limited in this regard and embodiments can be used with any type of protocol specifications.

Embodiments thus provide a methodology and tools for table-based specification and modeling. These techniques may include the concept of a semantic mapping for a table, which assigns a meaning (e.g., in the form of a code fragment) to each table cell. An algorithm can then be implemented to automatically generate efficient code from a table and corresponding semantic mapping. Still further, an algorithm can be implemented for subsetting a table using a predicate that specifies the subset declaratively rather than procedurally. Using such tables, coverage information in a simulation-based verification can be collected and analyzed to determine whether a given cell of the table has been examined.

For purposes of example and not as limitation, the following discussion is set forth using a table of a specification, for an example, a point-to-point interconnect protocol that can be used in a given platform, although the scope of the present invention is not limited in this regard.

Referring now to Table 1, shown is an example of a coherence protocol specification in accordance with an embodiment of the present invention.

TABLE 1

| | Current State | | | | | | Next State | | | | |
|---|---|---|---|---|---|---|---|---|---|---|---|
| RspChan | ReqCch | BiasFwd | BiasShrd | HomeChan | RspChan | | ReqCch | ReqCch | ReqOrb | RspChan |
| Msg to Req for Peer | State | Mask | BiasFwd | BiasShrd | Req to Home | Req to Peer | Req to Home | State | Mask | State | Msg |
| Cmp_FwdCode | M | Full | TRUE | FALSE | RspFwdIWb | DataC_F | WbIData | I | Empty | None | Remove |
| Cmp_FwdCode | M | Full | TRUE | TRUE | RspFwdSWb | DataC_F | WbSData | S | | None | Remove |
| Cmp_FwdCode | M | Full | FALSE | FALSE | RspIWb | | WbIData | I | Empty | None | Remove |
| Cmp_FwdCode | M | Full | FALSE | TRUE | RspSWb | | WbSData | S | | None | Remove |
| Cmp_FwdCode | M | Not Full | | | RspIWb | | WbIDataPtl | I | Empty | None | Remove |
| Cmp_FwdCode | E | Full | | FALSE | RspFwdI | DataC_F | | I | Empty | None | Remove |
| Cmp_FwdCode | E | Full | | TRUE | RspFwdS | DataC_F | | S | | None | Remove |
| Cmp_FwdCode | E | Empty | | | RspI | | | I | Empty | None | Remove |
| Cmp_FwdCode | F | | | FALSE | RspFwdI | DataC_F | | I | Empty | None | Remove |
| Cmp_FwdCode | F | | | TRUE | RspFwdS | DataC_F | | S | | None | Remove |
| Cmp_FwdCode | S | | | FALSE | RspI | | | I | Empty | None | Remove |
| Cmp_FwdCode | S | | | TRUE | RspS | | | | | None | Remove |
| Cmp_FwdCode | I | | | | RspI | | | | | None | Remove |
| Cmp_FwdInvOwn | M | Full | TRUE | | RspFwdI | DataC_M | | I | Empty | None | Remove |
| Cmp_FwdInvOwn | M | Full | FALSE | | RspIWb | | WbIData | I | Empty | None | Remove |
| Cmp_FwdInvOwn | M | Not Full | | | RspIWb | | WbIDataPtl | I | Empty | None | Remove |

TABLE 1-continued

| Current State | | | | | Next State | | | | | |
|---|---|---|---|---|---|---|---|---|---|---|
| RspChan | ReqCch | | BiasFwd | BiasShrd | HomeChan | RspChan | | ReqCch | ReqCch | ReqOrb | RspChan |
| Msg to Req for Peer | State | Mask | BiasFwd | BiasShrd | Req to Home | Req to Peer | Req to Home | State | Mask | State | Msg |
| Cmp_FwdInvOwn | E | Full | | | RspFwdI | DataC_E | | I | Empty | None | Remove |
| Cmp_FwdInvOwn | E | Empty | | | RspI | | | I | Empty | None | Remove |
| Cmp_FwdInvOwn | F, S, I | | | | RspI | | | I | Empty | None | Remove |
| Cmp_FwdInvItoE | M | Full | | | RspIWb | | WbIData | I | Empty | None | Remove |
| Cmp_FwdInvItoE | M | Not Full | | | RspIWb | | WbIDataPtl | I | Empty | None | Remove |
| Cmp_FwdInvItoE | E, F, S, I | | | | RspI | | | I | Empty | None | Remove |

As shown in Table 1, the first three rows, shown in bold font, form a header of the table. Note that while shown in this example as having three rows, the number of header rows is not limited in this regard. A column in the table is uniquely identified by the contents of its header row cells. For example, the second column from the left is identified by the following three cells (which are delimited by the vertical bar "|"): |Current State|ReqCch|State|. Note that each cell may include various state information. In the embodiment shown in Table 1, in the "Current State" portion of the Table, such state information may include given messages on a response channel from a requestor agent for another agent of a system that may generate requests to memory, referred to herein as a peer agent, a requested cache coherency state and mask for the state, as well as whether a given state is biased for a forward state or a shared state. With regard to a "Next State" portion of the Table which relates to a next state or action to occur from a current state, a message sent on a message channel such as a home channel from the requestor to a home agent, which may be a coherency controller, is identified, as well as messages on the response channel both to peer agent and to the home agent. Still further, the "Next State" portion of the Table shows requested cache coherency states, the state of a request outgoing request buffer (ORB) and a response channel message. In Table 1, all of the cells for these last two columns may correspond to a "None" value or a "Remove" value to indicate that after such actions, the given entries may be deallocated. Of course, while shown with this implementation in Table 1, the scope of the present invention is not limited in this regard.

A semantic mapping for this Table assigns a code fragment to each (non-empty) cell of the table and can be organized according to a header-based format, e.g., according to columns. For example, the second column has the following semantic mapping:

COLUMN|Current State|ReqCch|State|
|M| => ReqCch.State in {CCH_M}
|E| => ReqCch.State in {CCH_E}
|F| => ReqCch.State in {CCH_F}
|S| => ReqCch.State in {CCH_S}
|I| => ReqCch.State in {CCH_I}
|F, S, I| => ReqCch.State in {CCH_F, CCH_S, CCH_I}
|E, F, S, I| => ReqCch.State in {CCH_E, CCH_F, CCH_S, CCH_I}

This semantic mapping identifies (for instance) that each cell in the second column containing a value in the modified "M" state is mapped to the code fragment "ReqCch.State in {CCH_M}".

In Table 1, each cell in a "Current State" column is mapped to a state predicate that is either true or false in every protocol state. Each cell in a "Next State" column is mapped to a state transformer that performs an action on the current protocol state. The semantics of a (non-header) row is a guarded command of the following form:

if P1 & P2 & ... & Pn then T1; T2; ...; Tm endif where P1, ..., Pn are the state predicates corresponding the (non-empty) "Current State" cells in this row and T1, ..., Tm are the state transformers corresponding the (non-empty) "Next State" cells in this row. The semantics of an entire table can thus be defined as the collection of all guarded commands corresponding to the (non-header) rows of Table 1.

Efficient code can be generated from such tables and semantic mappings. As an example, if in each "Current State" column the distinct state predicates assigned by the semantic mapping are also semantically mutually exclusive to each other, then the collection of guarded commands corresponding to the whole table can be collapsed into a single guarded command which can be more efficiently executed than the original collection of guarded commands because repeated executions of the same state predicate is eliminated.

For example, the following collection of guarded commands:

if P1 & Q1 & R1 then T0 endif
if P1 & Q1 & R2 then T1 endif
if P1 & Q1 & R3 then T2 endif
if P1 & Q2 & R4 then T3 endif
if P1 & Q2 & R5 then T4 endif
if P1 & Q3 then T5 endif
if P2 & Q1 & R1 then T6 endif
if P2 & Q1 & R2 then T7 endif
if P2 & Q3 & R1 then T8 endif
if P2 & Q3 & R2 then T9 endif can be collapsed into:

if P1 then if Q1 then if R1 then T0
    elseif R2 then T1
    elseif R3 then T2 endif
  elseif Q2 then if R4 then T3
    elseif R5 then T4 endif
  elseif Q3 then T5 endif
elseif P2 then if Q1 then if R1 then T6
    elseif R2 then T7 endif
  elseif Q3 then if R1 then T8
    elseif R2 then T9 endif endif endif.

Note, for instance, that the predicate P1 is computed only once in the collapsed version, instead of six times as in the uncollapsed version.

Using this technique, Table 1 shown above can be effectively transformed into Table 2 below, where each "megacell" (which is shaded) represents the merging of multiple instances of the same state predicate in the original table. Thus an algorithm can be implemented for automatically generating efficient code from a table and a semantic mapping using the above technique.

TABLE 2

| Current State | | | | | Next State | | | | | |
|---|---|---|---|---|---|---|---|---|---|---|
| RspChan | ReqCch | BiasFwd | BiasShrd | HomeChan | RspChan | | ReqCch | ReqCch | ReqOrb | RspChan |
| Msg to Req for Peer | State | Mask | BiasFwd | BiasShrd | Req to Home | Req to Peer | Req to Home | State | Mask | State | Msg |
| Cmp_FwdCode | M | Full | TRUE | FALSE | RspFwdIWb | DataC_F | WbIData | I | Empty | None | Remove |
| | | | TRUE | TRUE | RspFwdSWb | DataC_F | WbSData | S | | None | Remove |
| | | | FALSE | FALSE | RspIWb | | WbIData | I | Empty | None | Remove |
| | | | | TRUE | RspSWb | | WbSData | S | | None | Remove |
| | | Not Full | | | RspIWb | | WbIDataPtl | I | Empty | None | Remove |
| | E | Full | | FALSE | RspFwdI | DataC_F | | I | Empty | None | Remove |
| | | | | TRUE | RspFwdS | DataC_F | | S | | None | Remove |
| | | Empty | | | RspI | | | I | Empty | None | Remove |
| | F | | | FALSE | RspFwdI | DataC_F | | I | Empty | None | Remove |
| | | | | TRUE | RspFwdS | DataC_F | | S | | None | Remove |
| | S | | | FALSE | RspI | | | I | Empty | None | Remove |
| | | | | TRUE | RspS | | | | | None | Remove |
| | I | | | | RspI | | | | | None | Remove |
| Cmp_FwdInvOwn | M | Full | TRUE | | RspFwdI | DataC_M | | I | Empty | None | Remove |
| | | | FALSE | | RspIWb | | WbIData | I | Empty | None | Remove |
| | | Not Full | | | RspIWb | | WbIDataPtl | I | Empty | None | Remove |
| | E | Full | | | RspFwdI | DataC_E | | I | Empty | None | Remove |
| | | Empty | | | RspI | | | I | Empty | None | Remove |
| | F, S, I | | | | RspI | | | I | Empty | None | Remove |
| Cmp_FwdInvItoE | M | Full | | | RspIWb | | WbIData | I | Empty | None | Remove |
| | | Not Full | | | RspIWb | | WbIDataPtl | I | Empty | None | Remove |
| | E, F, S, I | | | | RspI | | | I | Empty | None | Remove |

Typically, a given implementation of a protocol specification used in defining a platform may realize only a subset of the behaviors allowed by the specification. In terms of a protocol table, this is reflected by the implementation being able to exercise only a subset of the rows in the table. Thus it is often desirable to have an easy way to identify and compute such subsets.

A technique for specifying a subset of a table is to regard the table as a relation, where the "variables" are column identifiers and the table rows specify the allowed "assignments" of values (i.e., cell values) to these variables, and use a predicate on these variables to specify the subset. For example, we may wish to specify a subset of the above Table 2 in which the cache state is never left in the shared ("S") state by the state transition and data forwarding to a peer agent never happens. This condition can be expressed by generating the following predicate:

|Next State|ReqCch|State|!=S &
|Next State|RspChan|Req to Peer|!=DataC_F &
|Next State|RspChan|Req to Peer|!=DataC_E &
|Next State|RspChan|Req to Peer|!=DataC_M In this predicate, the statements thus identify column values that are to not appear in any cells of the Table. Thus an algorithm may be used to take a predicate and corresponding table and automatically generate a subsetted table. As one example, using the above predicate, the subsetted version of Table 2 as limited by the above predicate can be generated as shown in Table 3.

TABLE 3

| Current State | | | | | Next State | | | | | |
|---|---|---|---|---|---|---|---|---|---|---|
| RspChan | ReqCch | BiasFwd | BiasShrd | HomeChan | RspChan | | ReqCch | ReqCch | ReqOrb | RspChan |
| Msg to Req for Peer | State | Mask | BiasFwd | BiasShrd | Req to Home | Req to Peer | Req to Home | State | Mask | State | Msg |
| Cmp_FwdCode | M | Full | FALSE | FALSE | RspIWb | | WbIData | I | Empty | None | Remove |
| Cmp_FwdCode | M | Not Full | | | RspIWb | | WbIDataPtl | I | Empty | None | Remove |
| Cmp_FwdCode | E | Empty | | | RspI | | | I | Empty | None | Remove |
| Cmp_FwdCode | S | | | FALSE | RspI | | | I | Empty | None | Remove |
| Cmp_FwdCode | S | | | TRUE | RspS | | | | | None | Remove |
| Cmp_FwdCode | I | | | | RspI | | | | | None | Remove |
| Cmp_FwdInvOwn | M | Full | FALSE | | RspIWb | | WbIData | I | Empty | None | Remove |
| Cmp_FwdInvOwn | M | Not Full | | | RspIWb | | WbIDataPtl | I | Empty | None | Remove |
| Cmp_FwdInvOwn | E | Empty | | | RspI | | | I | Empty | None | Remove |
| Cmp_FwdInvOwn | F, S, I | | | | RspI | | | I | Empty | None | Remove |
| Cmp_FwdInvItoE | M | Full | | | RspIWb | | WbIData | I | Empty | None | Remove |
| Cmp_FwdInvItoE | M | Not Full | | | RspIWb | | WbIDataPtl | I | Empty | None | Remove |
| Cmp_FwdInvItoE | E, F, S, I | | | | RspI | | | I | Empty | None | Remove |

Thus in Table 3, all rows of original Table 2 having a S state or indicating a data forwarding to peer agent do not appear.

In performing simulation-based verification, an issue is to determine what features have or have not been exercised by test vectors. A table-based specification in accordance with an embodiment of the present invention may provide a natural and simple way to measure coverage. As one example, a monitor may be established to indicate which table rows have or have not been traversed during simulations. For example, the code generation algorithm can be modified to insert coverage collecting instrumentation. For example, a data structure including an indicator for each cell may be created, and instrumentation code can be inserted to set each indicator (which can be a single bit) when the corresponding cell has been exercised. In other implementations, code can be inserted to associate a count of a plurality of counts, each corresponding to a cell of the table, and each updated with each exercise of the cell.

Figure 2:
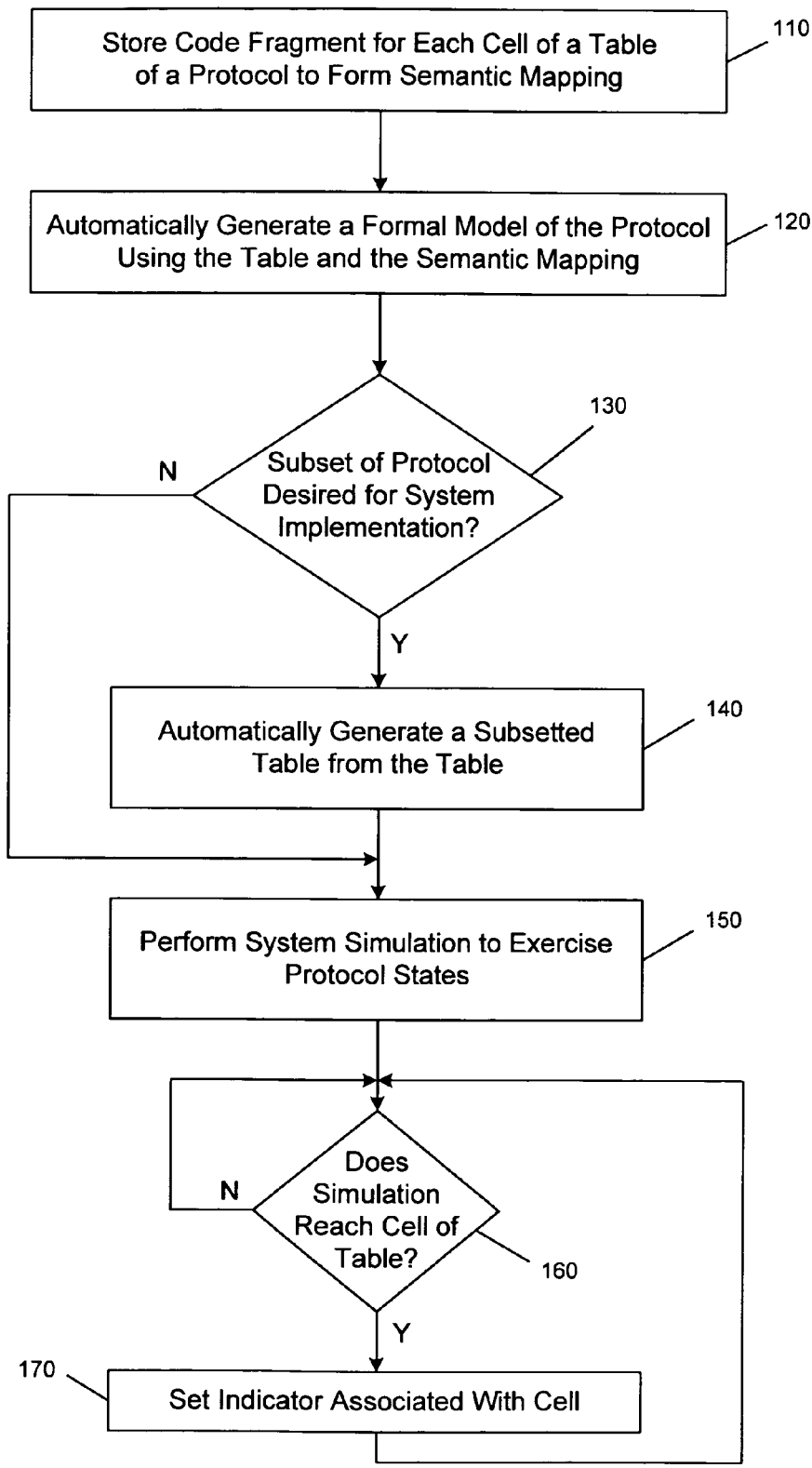
FIG. 2 is a flow diagram of automatic code generation in accordance with an embodiment of the present invention.

Referring now to FIG. 2, shown is a flow diagram of a method in accordance with an embodiment of the present invention. As shown in FIG. 2, method 100 may be used to automatically generate a table-based protocol for a given system and to determine an extent of exercising of different states of the protocol when performing system simulations. As shown in FIG. 2, method 100 may begin by storing a code fragment for each cell of a table of a protocol to thus form a semantic mapping (block 110). In one embodiment, the semantic mapping may be configured according to a header-based structure of the table, e.g., in a column-based manner. Such code fragments may be stored in a data structure, e.g., of a DRAM, where the table itself may be stored in a separate data structure, also stored in the DRAM. Then, a formal model of the protocol may be automatically generated using the table and the semantic mapping (block 120). As an example, guarded statements may be generated for each row of the table, where at least one portion of the table may be associated with current states, each cell of which is identified in a guarded statement with a state predicate, while at least the second portion of the table may be associated with a next state from the given state, each cell of which may be associated with a state transformer in the guarded statement. Furthermore, while not shown specifically in FIG. 2, understand that a collapsing of such guarded statements for mutually exclusive state predicate values can be performed.

After automatically generating this formal model, it may be determined whether a subset of the formal model is desired for a given system implementation (diamond 130). If so, control passes to block 140 where a subsetted table may be automatically generated from the table. Control then passes to block 150 where a system simulation may be performed to exercise the various protocol states available in the proposed system. To check coverage of the simulation, it may be determined whether a simulation reaches a given cell of the table (diamond 160). If so, an indicator associated with that cell may be set (block 170). Diamond 160 and block 170 may be performed for each such state achieved in the simulation, until the simulation is concluded. While shown with a simple setting of an indicator in the embodiment of FIG. 2, understand that a counter-based analysis may instead be performed. While shown with this particular implementation in the embodiment of FIG. 2, the scope of the present invention is not limited in this regard.

Figure 3:
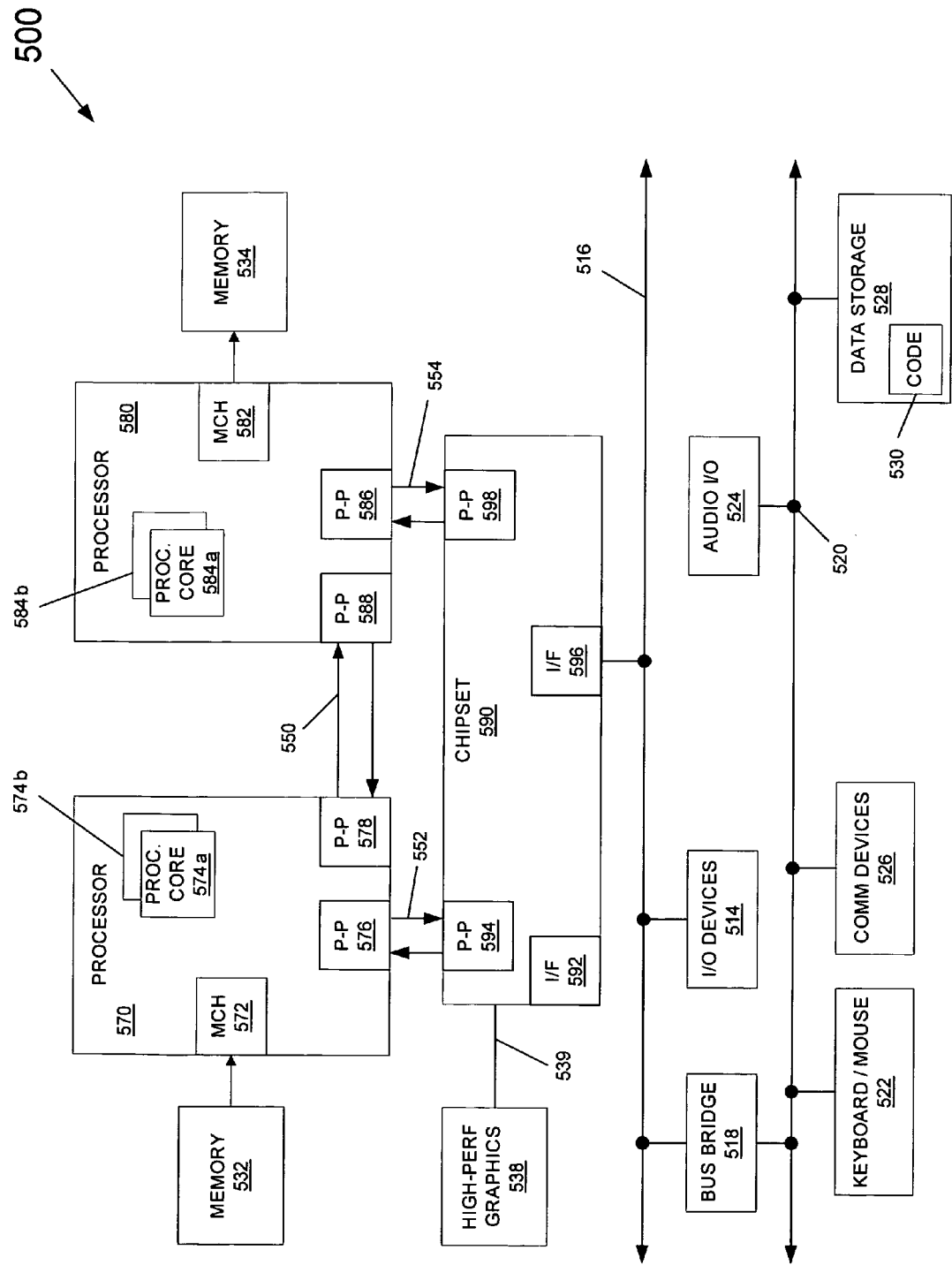
FIG. 3 is a block diagram of a system in accordance with an embodiment of the present invention.

Embodiments may be implemented in many different system types. Referring now to FIG. 3, shown is a block diagram of a system in accordance with an embodiment of the present invention. As shown in FIG. 3, multiprocessor system 500 is a point-to-point interconnect system, and includes a first processor 570 and a second processor 580 coupled via a point-to-point interconnect 550. As shown in FIG. 3, each of processors 570 and 580 may be multicore processors, including first and second processor cores (i.e., processor cores 574a and 574b and processor cores 584a and 584b), although potentially many more cores may be present in the processors. In various embodiments, system 500 may be a type of system having a coherency protocol that can be automatically generated using an embodiment of the present invention. Furthermore, system 500 may be used to automatically generate protocol specifications for other system implementations, possibly such system implementations having a different subset of the protocol specification. To that end, various simulations may be run on system 500 for the proposed system under design, where the automatically generated table, which may be a subset of the table for the actual system 500, may be used to identify which cells of the subset of the table of the proposed system have been exercised during this simulation.

Still referring to FIG. 3, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 2, MCH's 572 and 582 couple the processors to respective memories, namely a memory 532 and a memory 534, which may be portions of main memory (e.g., a DRAM) locally attached to the respective processors. First processor 570 and second processor 580 may be coupled to a chipset 590 via P-P interconnects 552 and 554, respectively. As shown in FIG. 3, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 3, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:

associating and storing a code fragment for each cell of a table for a protocol specification in a semantic mapping corresponding to the table, wherein the semantic mapping is configured according to a header-based structure of the table, the table stored in a first data structure and the semantic mapping stored in a second data structure; and automatically generating a formal model for the protocol specification using the table and the semantic mapping, the formal model according to an implementation agnostic model (IAM), and including generating a code segment using the table and the semantic mapping by forming a plurality of guarded statements each including a plurality of state predicates each associated with a cell of a first portion of the table and a state transformer associated with a cell of a second portion of the table.

2. The method of claim 1, wherein the state transformer of each of the guarded statements corresponds to an action to be performed if the plurality of state predicates of the guarded statement are of a first state, and wherein the guarded statement is to indicate that the state transformer is to not be performed if at least one of the plurality of state predicates is not of the first state.

3. The method of claim 1, further comprising collapsing the plurality of guarded statements having a first count of guarded statements into a collapsed set of guarded statements having a second count of guarded statements that is smaller than the first count if the state predicates are mutually exclusive as to each other.

4. The method of claim 3, further comprising computing at least one of the state predicates a single time in the collapsed set of guarded statements, wherein the at least one state predicate would be computed multiple times in the plurality of guarded statements.

5. The method of claim 3, further comprising transforming at least a first plurality of cells of the table of a common instance into a single cell, based on the collapsed set of guarded statements.

6. The method of claim 1, further comprising automatically generating a subsetted table using the table, responsive to a predicate including a plurality of actions or states that are not to occur in a system that implements the protocol specification.

7. The method of claim 1, further comprising determining whether a state or action of a system that implements the protocol specification has been exercised during a simulation based on monitoring of the table.

8. The method of claim 7, wherein the monitoring includes setting an indicator associated with a cell when a state or an action associated with the cell has been exercised.

9. An article comprising a non-transitory machine-accessible medium including instructions that when executed cause a system to:

associate and store a code fragment for each cell of a table for a protocol specification in a semantic mapping corresponding to the table, wherein the semantic mapping is configured according to a header-based structure of the table, the table stored in a first data structure and the semantic mapping stored in a second data structure; and automatically generate a formal model for the protocol specification using the table and the semantic mapping, the formal model according to an implementation agnostic model (IAM), and including generation of a code segment using the table and the semantic mapping by forming a plurality of guarded statements each including a plurality of state predicates each associated with a cell of a first portion of the table and a state transformer associated with a cell of a second portion of the table.

10. The article of claim 9, wherein the state transformer of each of the guarded statements corresponds to an action to be performed if the plurality of state predicates of the guarded statement are of a first state, and wherein the guarded statement is to indicate that the state transformer is to not be performed if at least one of the plurality of state predicates is not of the first state.

11. The article of claim 9, further comprising instructions that when executed enable the system to collapse the plurality of guarded statements having a first count of guarded statements to form a collapsed set of guarded statements having a second count of guarded statements that is smaller than the first count if the state predicates are mutually exclusive as to each other.

12. The article of claim 11, further comprising instructions that when executed enable the system to transform at least a first plurality of cells of the table of a common instance into a single cell, based on the collapsed set of guarded statements.

13. The article of claim 9, further comprising instructions that when executed enable the system to automatically generate a subsetted table using the table, responsive to a predicate including a plurality of actions or states that are not to occur in a platform that implements the protocol specification.

14. The article of claim 13, further comprising instructions that when executed enable the system to determine whether a state or action of a platform that implements the protocol specification has been exercised during a simulation based on monitoring of the table, and if so, to set an indicator associated with a cell when a state or an action associated with the cell has been exercised.

15. The article of claim 11, further comprising instructions that when executed enable the system to compute at least one of the state predicates a single time in the collapsed set of guarded statements, wherein the at least one state predicate would be computed multiple times in the at least some of the plurality of guarded statements.

* * * * *